(12) United States Patent
Wiesen et al.

(10) Patent No.: US 6,317,598 B1
(45) Date of Patent: Nov. 13, 2001

(54) DEVICE AND METHOD FOR ADMINISTERING AND ASSIGNING RADIO TRANSMISSION CHANNELS IN MOBILE RADIO NETWORKS

(75) Inventors: Michael Wiesen, Ulm; Michael Färber, Wolfratshausen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/468,376

(22) Filed: Dec. 20, 1999

Related U.S. Application Data (63) Continuation of application No. PCT/DE98/01690, filed on Jun. 19, 1998.

(30) Foreign Application Priority Data

Jun. 19, 1997 (DE) .............................. 197 26 101

(51) Int. Cl.[7] .............................. H04B 17/00; H04Q 7/34
(52) U.S. Cl. .............................. 455/443; 455/452; 455/62; 455/67.1; 370/329
(58) Field of Search .................................... 455/436–444, 455/450–453, 560, 561, 509, 514, 525, 67.1, 62, 414; 370/329

(56) References Cited

U.S. PATENT DOCUMENTS

| | | |
|---|---|---|
| 4,144,412 | 3/1979 | Ito et al. . |
| 6,097,733 | * 8/2000 | Basu et al. .......................... 455/560 |

FOREIGN PATENT DOCUMENTS

| | | |
|---|---|---|
| 45 15 287 A1 | 11/1993 | (DE) . |
| 0 504 122 A2 | 9/1992 | (EP) . |
| 0 701 382 A1 | 3/1996 | (EP) . |
| 95/34957 | 12/1995 | (WO) . |

OTHER PUBLICATIONS

"Channel Assignment Schemes for Cellular Mobile Telecommunication System: A Comprehensive Survey" (Katzela et al.), IEEE Personal Communications, Jun. 1996, pp. 10–31.

"Resource Management for Third Generation Cellular Communication Systems" (Chen et al.), IEEE, vol. 3, May 4, 1997, pp. 1832–1836.

"Implementation and Performance Analysis of Multi–Algorithm Dynamic Channel Allocation in a Wideband Cellular Network" (Vucetic et al.), IEEE Internal Conference on Communication, vol. 3, No. 23, Jun. 1996, pp. 1270–1274.

* cited by examiner

Primary Examiner—Lester G. Kincaid
(74) Attorney, Agent, or Firm—Herbert L. Lerner; Laurence A. Greenberg; Werner H. Stemer (57) ABSTRACT

A device for assigning radio transmission channels administers the radio transmission channels within a radio zone and optimizes the utilization of the radio transmission channels. The radio transmission channels for communications links from/to a mobile station are assigned to at least one base station. The device for assigning the radio transmission channels includes a signal evaluation device, a memory device, and a control device. The memory device stores matrices with one or more parameters. The assignment of the radio transmission channels advantageously changes dynamically as a function of the variation of the parameters in the matrices. A method for administering and assigning radio transmission channels is also provided.

38 Claims, 3 Drawing Sheets

| Selection Matrix CM for Mobile Station MS | BTS1 | BTS2 | BTS3 | BTS4 |
|---|---|---|---|---|
| Transmission Properties (RXLEV, RXQUAL) [1...10] | 8 | 10 | 3 | 7 |
| Communications Connections with Service Classes [A, B, C, D] | A1 | A1 | - | C1 |

FIG 5

| Resource Matrix RM for Radio Transmission Channels | BTS1 | BTS2 | BTS3 | BTS4 |
|---|---|---|---|---|
| F1 | Free | Free | Free | Assigned |
| F2 | Blocked | Free | Free | Free |
| F3 | Free | Assigned | Free | Free |
| F4 | Free | Free | Free | Free |
| F5 | Assigned | Free | Blocked | Free |

DEVICE AND METHOD FOR ADMINISTERING AND ASSIGNING RADIO TRANSMISSION CHANNELS IN MOBILE RADIO NETWORKS

CROSS-REFERENCE TO RELATED APPLICATION

This application is a continuation of copending International Application No. PCT/DE98/01690, filed Jun. 19, 1998, which designated the United States.

BACKGROUND OF THE INVENTION

Field of the Invention

The invention relates to a device and the method for administering and assigning radio transmission channels within a radio zone in a mobile radio network.

Third generation mobile radio networks will make it possible for a mobile subscriber to access a large number of communications services with different transmission properties and transmission demands. In order to implement these possibilities, the limited number of radio transmission channels on the air interface must be administered and assigned in an optimum way without experiencing restrictions as a result of the different requirements which are placed on the transmission of the communications services.

Two methods for dynamically administering and assigning radio transmission channels (DCA—Dynamic Channel Allocation) are known from the article "Channel Assignment Schemes for Cellular Mobile Telecommunications Systems: A Comprehensive Survey"; IEEE Personal Communications; Jun. 1996; pages 10–31 by I. Katzela, M. Naghshineh. In both methods, all the radio transmission channels are combined in a central pool and assigned dynamically to the radio cells when new communications links occur. Here, each radio transmission channel can be used in each radio cell provided that the interference conditions are met.

A distinction is made between a centralized and a distributed DCA method. In the case of the centralized DCA method, a central controller assigns a radio transmission channel temporary for a communications link, whereas in the case of the distributed DCA method the base station, at which the connection request occurs, assigns a radio transmission channel temporary for a communications link. In the base station, the assignment is carried out here solely on the basis of the base station's own information concerning the interference situation and the capacity utilization.

These two methods for administering and assigning the radio transmission channels have the disadvantage that only the transmission criteria are used as the basis for the assignment decisions and the respective requirements placed on the transmission by the different communications links are not taken into account.

U.S. Pat. No. 4,144,412 discloses a method for assigning radio channels to a calling mobile station in a mobile radio network, in which a mobile base station which is suitable for setting up the radio link and a free voice channel are selected in a central radio control device. This selection is made on the basis of intensity measurements of the signals transmitted by the mobile station through the use of mobile base stations which are connected to the radio control device. The respective intensity measurements are compared in a radio control device, and the mobile base station with the maximum intensity is selected. A free voice channel of the selected mobile base station is subsequently determined and assigned to the radio link. The mobile base stations and the voice channels or their current status are administered in memory devices in the radio control device.

Published European patent application EP 0 504 122 A2 discloses a method for a handover control in a cellular communications system. In this method, not only the base station which is currently in charge of supplying radio sevices but also a respective adjacent base station can also initiate a handover of a mobile station.

International patent publication WO 95/34957 discloses a method for the adaptive and automatic planning of the assignment of frequencies to transmission channels within a number of radio cells in a cellular communications system. In this context, quality parameters are determined for all the available frequencies. A respective frequency is assigned to each transmission channel according to an analysis of the measured quality parameters in conjunction with predefined criteria.

The article "Implementation and Performance Analysis of Multi-Algorithm Dynamic Channel Allocation in a Wideband Cellular Network" by J. Vucetic, 1996 IEEE International Conference on Communications (ICC), Converging Technologies for Tomorrow's Applications, Dallas, Jun. 23–27, 1996, Vol. 3, Jun. 23, 1996, pages 1270–1274 discloses a method in which the probability of blocking in a digital cellular network is reduced by using a plurality of dynamic channel assignment algorithms. For this purpose, a plurality of algorithms are implemented simultaneously in one switching device of the network. A respectively suitable algorithm which ensures a minimum probability of blocking is selected as a function of a current traffic load and an interference situation.

SUMMARY OF THE INVENTION

It is accordingly an object of the invention to provide a device and a method for administering and assigning radio transmission channels which overcome disadvantages of the heretofore-known methods and devices of this general type and which provide an optimum utilization of radio transmission capacities, in particular an optimum utilization of the limited number of radio transmission channels within one radio zone.

With the foregoing and other objects in view there is provided, in accordance with the invention, in a mobile radio network having base stations supplying radio resources to overlapping radio cells and having a mobile station located in a radio zone of the mobile radio network, a device for administering and assigning radio transmission channels, the device including a signal evaluation device to be connected to the base stations, the signal evaluation device determining transmission properties between the mobile station and the base stations; a memory device connected to the signal evaluation device and storing at least one selection matrix and at least one resource matrix, the memory device storing the transmission properties as parameters in the least one selection matrix, the transmission properties being assigned to respective ones of the base stations, the memory device storing a service class of a communications link as a further parameter, and the memory device administering radio transmission channels to be assigned in the radio zone, the radio transmission channels being parameters in the at least one resource matrix; and a control device connected to the memory device, the control device evaluating the parameters in the at least one selection matrix and assigning at least one of the radio transmission channels and at least one of the base stations to the communications link associated with the mobile station.

In accordance with another feature of the invention, the at least one selection matrix is a plurality of selection matrices, a respective one of the selection matrices is stored for each mobile station in the radio zone.

In accordance with yet another feature of the invention, the memory device additionally stores properties and performance features of the mobile station as parameters in the at least one selection matrix, and the control device takes in to account the properties and performance features of the mobile station when assigning the at least one of the radio transmission channels and the at least one of the base stations.

In accordance with a further feature of the invention, the memory device additionally stores a time period indicating how long the mobile station is located in the radio cells as a parameter in the at least one selection matrix, and the control device takes into account this time period when assigning the at least one of the radio transmission channels and the at least one of the base stations.

In accordance with yet a further feature of the invention, the memory device stores the radio transmission channels together with a respective state of the radio transmission channels as parameters in the at least one resource matrix, and the control device takes into account the transmission channels together with the respective state when assigning the at least one of the radio transmission channels.

In accordance with another feature of the invention, the device for administering and assigning radio transmission channels is implemented in a switching device connected to the mobile radio network, or alternatively, the device for administering and assigning radio transmission channels is implemented as a stand-alone component in the mobile radio network and is connected to a switching device.

With the objects of the invention in view there is also provided, a network controller configuration, including a plurality of devices for assigning radio transmission channels, the plurality of devices including a first device and a second device connected to the first device, each of the first and second devices including a signal evaluation device to be connected to base stations supplying radio resources to overlapping radio cells, the signal evaluation device determining transmission properties between a mobile station located in a radio zone and the base stations; a memory device connected to the signal evaluation device and storing at least one selection matrix and at least one resource matrix, the memory device storing the transmission properties as parameters in the least one selection matrix, the transmission properties being assigned to respective ones of the base stations, the memory device storing a service class of a communications link as a further parameter, and the memory device administering radio transmission channels to be assigned in the radio zone, the radio transmission channels being parameters in the at least one resource matrix; and a control device connected to the memory device, the control device evaluating the parameters in the at least one selection matrix and assigning at least one of the radio transmission channels and at least one of the base stations to the communications link associated with the mobile station.

With the objects of the invention in view there is further provided, a method for administering and assigning radio transmission channels to at least one communications link of a mobile radio network. The method includes the steps of connecting at least one device for administering and assigning radio transmission channels to at least two base stations, the at least two base stations supplying respective overlapping radio cells with radio resources; determining and evaluating transmission properties between the at least two base stations and at least one mobile station located in a radio zone of the at least one device for administering and assigning the radio transmission channels; storing the transmission properties as parameters in a selection matrix; assigning the transmission properties to respective ones of the at least two base station; storing a service class of a communications link associated with the at least one mobile station as a further parameter in the selection matrix; assigning, with the device for administering and assigning the radio transmission channels, at least one of the radio transmission channels and at least one of the at least two base station to the communications link associated with the at least one mobile station as a function of an evaluation of the parameters and the further parameter in the selection matrix; and administering the radio transmission channels assignable in the radio zone in a resource matrix.

In accordance with another mode of the invention, the transmission properties are determined with at least one mobile station and a respective one of the at least two base stations.

In accordance with yet another mode of the invention, the parameters are cyclically updated in at least one of the selection matrix and the resource matrix with a signal evaluation device.

In accordance with a further mode of the invention, the device for administering and assigning the radio transmission channels selects the at least one of the radio transmission channels and the at least one of the at least two base stations for the communications link associated with the at least one mobile station such that optimum transmission properties are ensured.

In accordance with yet a further mode of the invention, a new assignment of the radio transmission channels and a new selection of the at least one of the at least two base stations for the communications link associated with the at least one mobile station is initiated as a function of changes in the parameters in the selection matrix.

In accordance with another mode of the invention, a given number of the at least two base stations are assigned to the communications link associated with the at least one mobile station; and the given number is selected as a function of requirements of the service class in terms of the transmission properties.

In accordance with another mode of the invention, a given number of the at least two base stations is assigned to the communications link associated with the at least one mobile station; and the given number is selected as a function of a current location the at least one mobile station.

In accordance with a further mode of the invention, a given number of the at least two base stations is assigned to the communications link associated with the at least one mobile station; and the given number is selected as a function of a radio cell level in a hierarchical radio cell structure.

In accordance with yet a further mode of the invention, the given number is selected as a function of a time period during which the at least one mobile station is located in a given one of the radio cells.

In accordance with another mode of the invention, radio transmission channels associated with a given one of the at least two base stations are assigned to the communications link associated with the service class.

In accordance with yet another mode of the invention, radio transmission channels associated with a plurality of the at least two base stations are assigned to the communications link associated with the service class.

In accordance with a further mode of the invention, radio transmission channels associated with a given one of the at least two base stations are assigned to at least two communications links associated with different service classes.

In accordance with yet a further mode of the invention, radio transmission channels associated with a plurality of the at least two base stations are assigned to at least two communications links associated with different service classes.

In accordance with another mode of the invention, respective radio transmission channels of a plurality of the at least two base stations are assigned for the different service classes.

In accordance with a further mode of the invention, radio transmission channels of a plurality of the at least two base stations are assigned to an asymmetrical communications link in a downlink direction from the plurality of the at least two base stations to the at least one mobile station and in an uplink direction from the at least one mobile station to the plurality of the at least two base stations.

In accordance with yet a further mode of the invention, radio transmission channels of given ones of the at least two base stations are assigned to the at least one mobile station in the downlink direction and radio transmission channels of other ones of the at least two base stations are assigned to the at least one mobile station in the uplink direction.

In accordance with another mode of the invention, the communications link is divided into a plurality of signal components; and the plurality of signal components is assigned to different ones of the radio transmission channels associated with different ones of the at least two base stations.

In accordance with yet another mode of the invention, the signal components of the communications link are sequentially assigned to different radio transmission channels of a plurality of the at least two base stations.

In accordance with a further mode of the invention, the signal components of the communications link are assigned in parallel to different radio transmission channels of a plurality of the at least two base stations.

In accordance with yet a further mode of the invention, parameters of a plurality of mobile stations with identical transmission properties are administered in a common selection matrix.

In accordance with another mode of the invention, parameters of a plurality of mobile stations with communications links of identical service classes are administered in a common selection matrix.

According to the invention, the radio transmission channels are administered and assigned in a radio zone or radio cell by the device according to the invention. This device has at least one signal evaluation device, one memory device and one control device. Transmission properties between the mobile station and the respective base stations of the radio zone are determined in the signal evaluation device and stored as parameters in a selection matrix in the storage device. In addition, a service class is stored as a parameter in the selection matrix. Furthermore, a resource matrix in which the radio transmission channels, which are assignable in the radio zone of the device, are administered is stored in the memory device. The control device evaluates the stored parameters in the selection matrix and assigns at least one radio transmission channel and at least one base station to the communications link from/to the base station as a function of the evaluation.

According to one embodiment of the invention, the selection matrix can be formed with the following parameters or with any desired combination of these parameters which are assigned to the base stations in the administered radio zone:

properties of the radio transmission channels between the mobile station and base stations, communications links with service classes which are assigned in accordance with the requirements placed on the transmission properties, properties and performance features of the mobile station, period for which the mobile station is located in the radio cells (dwelling time).

According to a further embodiment, the resource matrix can be formed with the radio transmission channels as parameters, the states of the respective radio transmission channels being assigned to the base stations in the administered radio zone.

A selection matrix which is formed with one or more parameters makes it possible to configure the assignment of the radio transmission channels as a function of the change in the parameters. The number and selection of the base stations for the communications links to the mobile station and the assignment of the radio transmission channels to the base stations are advantageously changed dynamically, in order to implement an optimum load distribution.

According to a further embodiment, the parameters are updated cyclically. The transmission properties can be monitored in such a way that transmission parameters such as the strength of the received signal RXLEV (Receive Signal Input Level) and the signal quality RXQUAL (Radio Link Quality) are measured and combined in the radio network controller at regular time intervals or at time intervals which are determined by the transmission quality. These measurements make it possible, inter alia, to estimate the transmission losses and the co-channel interference.

It is possible to assign the radio transmission channels for communications links of identical or different service classes from/to the mobile station to one or more base stations. It is also possible for the radio transmission channels for asymmetrical communications links of service classes from/to the mobile station to be assigned to different base stations in the uplink and downlink directions.

In the case of communications links which are divided up into a plurality of signal components—for example for packet services—the signal components can be assigned sequentially or in parallel to different radio transmission channels of a plurality of base stations.

The device according to the invention can be implemented in a switching device of the mobile radio network or be connected to such a switching device, a plurality of devices according to the invention being expediently connected to one another in order to coordinate the administration and assignment of the radio transmission channels to the base stations across radio zones. This assignment across radio zones makes it possible, for example at the edges of the radio zones, to assign communications links from/to the mobile station to the base stations in different radio zones.

The description of an exemplary embodiment of the device according to the invention and of the method according to the invention is merely intended to be an example. The described features are not necessarily required in the manner illustrated in order to realize the desired objective.

Other features which are considered as characteristic for the invention are set forth in the appended claims.

Although the invention is illustrated and described herein as embodied in a device and method for administering and assigning radio transmission channels in mobile radio networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The invention presents a possible way of configuring the administration and assignment of the radio transmission channels F1 to F5 in a radio zone according to the method of dynamic channel assignment using a device which is to be designated as a radio network controller RNC. The designation radio network controller RNC (Radio Network Controller) is here the logical/functional designation of the device according to the invention. The radio network controller RNC can be implemented in a switching device of the mobile radio network or be connected to such a device. At least one selection matrix CM (Compatibility Matrix) and at least one resource matrix RM each with one or more parameters are stored in a memory device SP within the radio network controller RNC. Using a control device ST, the parameters in the selection matrix CM are evaluated and the radio transmission channels F1 to F5 are assigned to one or more base stations BTS1 to BTS4 for communications links from/to the mobile station. The assignment of the radio transmission channels F1 to F5 is changed dynamically as a function of changes of the parameters in the selection matrix CM. The control device ST also evaluates the resource matrix RM in which the respective states of free, assigned, blocked are assigned to the radio transmission channels.

Figure 1:
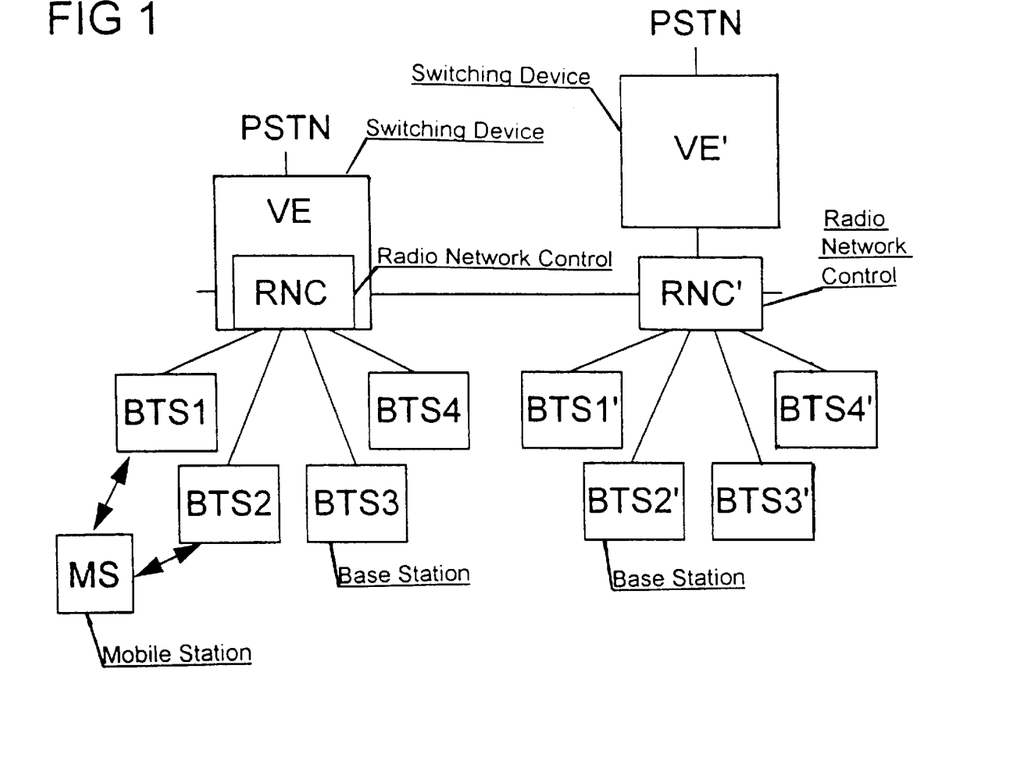
FIG. 1 is a block diagram of a part of a mobile radio network illustrating two configuration possibilities for the device according to the invention.

The part of a mobile radio network which is illustrated in FIG. 1 has two switching devices VE which each establish access to a fixed network PSTN. The radio network controllers RNC or RNC', which can be connected directly to one another or administered by a central switching device VE are implemented in a switching device or connected to such a device. In each case a plurality of base stations BTS1 to BTS4 or BTS1' to BTS4' for illuminating one radio zone in each case are connected to the radio network controllers. There are communications links between the base stations BTS1 and BTS2 and the mobile station MS which is illustrated as an example. Within the radio zone in which the mobile station MS is located, the radio network controller RNC administers the radio transmission channels F1 to F5 and assigns them to the base stations BTS1 to BTS4. The networking of a plurality of radio network controllers RNC makes it possible, for example in the edge region and overlapping region of the radio zones, to assign communication links from/to the mobile station to the base stations of different radio zones.

Figure 2:
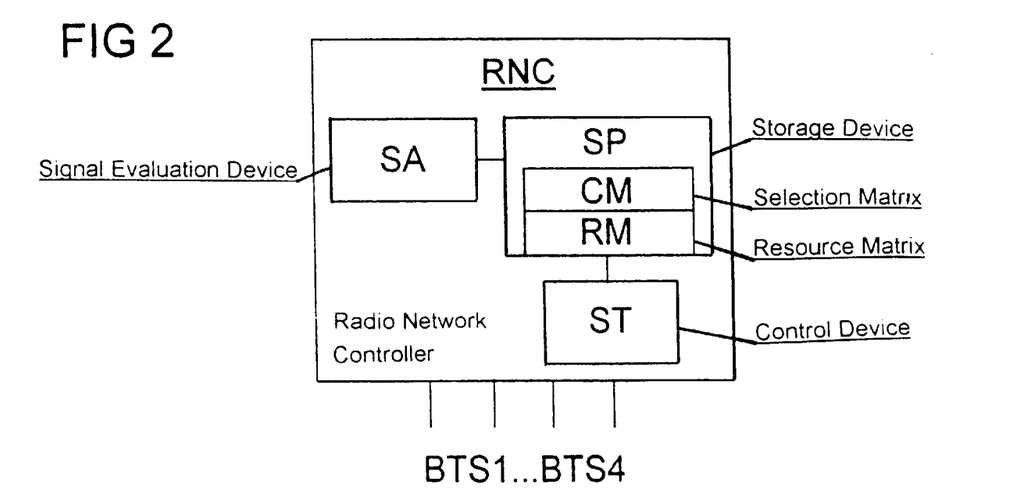
FIG. 2 is a block diagram of the device according to the invention with the components implemented therein.

FIG. 2 shows the block diagram of a radio network controller RNC according to the invention. A plurality of components which are connected to one another are implemented in the radio network controller RNC. A signal evaluation device SA evaluates the transmission properties of the radio transmission channels F1 to F5 between the base stations BTS1 to BTS4 and the mobile station MS. The transmission properties of the radio transmission channels F1 to F5 can be determined in each case by the mobile station MS, by the base stations BTS1 to BTS4 or, by the mobile station MS and the base stations BTS1 to BTS4 in, for example, the known manner by measuring the strength of the receive signals RXLEV and the signal quality RXQUAL. These measurements are carried out at regular time intervals or at time intervals determined by the transmission quality, passed on by the respective base station BTS1 to BTS4 and combined centrally in the radio network controller RNC.

At least one selection matrix CM is stored in the memory device SP. It is possible here for all the mobile stations located in the radio zone of the radio network controller RNC to store and administer in each case one selection matrix CM for each individual mobile station or for, for example, a plurality of mobile stations with identical or similar parameters.

Furthermore, at least one resource matrix RM is stored in the memory device SP.

The control device ST evaluates the selection matrix CM of the mobile station MS located in the radio zone, and the resource matrix RM, and assigns the radio transmission channels F1 to F5 to, for example, the base stations BTS1 and BTS2 for the communications links from/to the mobile station MS.

Figure 3:
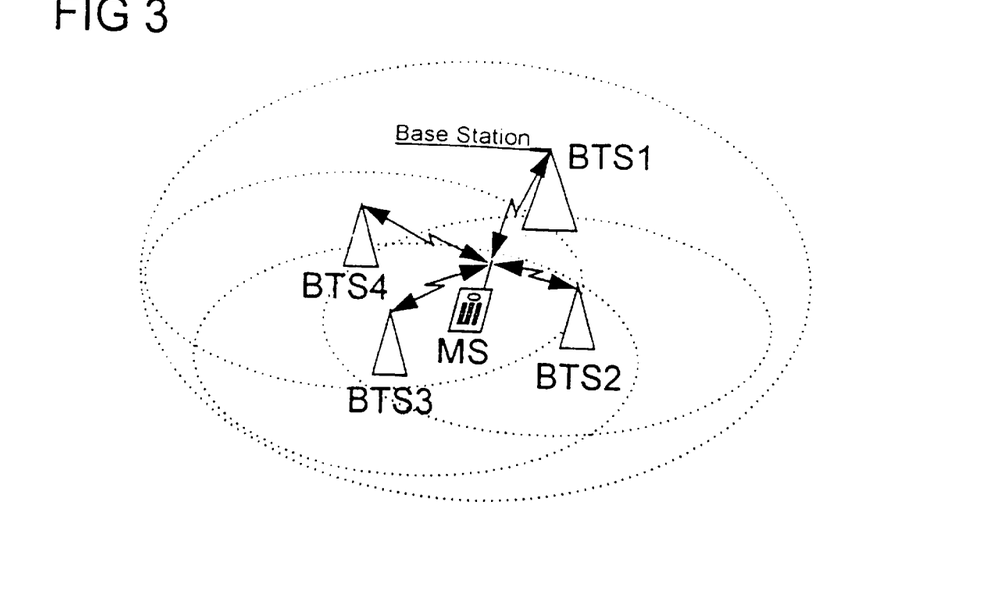
FIG. 3 is a diagrammatic illustration of a radio zone with a plurality of radio cells of different sizes and with a mobile station.

FIG. 3 shows the physical structure of a radio zone. The base stations BTS1 to BTS4 are connected a radio network controller RNC (not illustrated in FIG. 3) and have radio transmission channels assigned to them by the controller RNC.

The base stations BTS1 to BTS4 form a hierarchical cell structure which is characterized by the fact that the radio cells are of different sizes. The radio cells of the base stations BTS2 to BTS4 may therefore be, for example, micro cells or pico cells, and the radio cell of BTS1 may be a macro cell. The micro cells and pico cells overlap and the macro cell of the base station BTS1 is superimposed on them. The mobile station MS of the mobile subscriber is located in a region where the radio cells of the four base stations BTS1 to BTS4 overlap.

Figure 4:
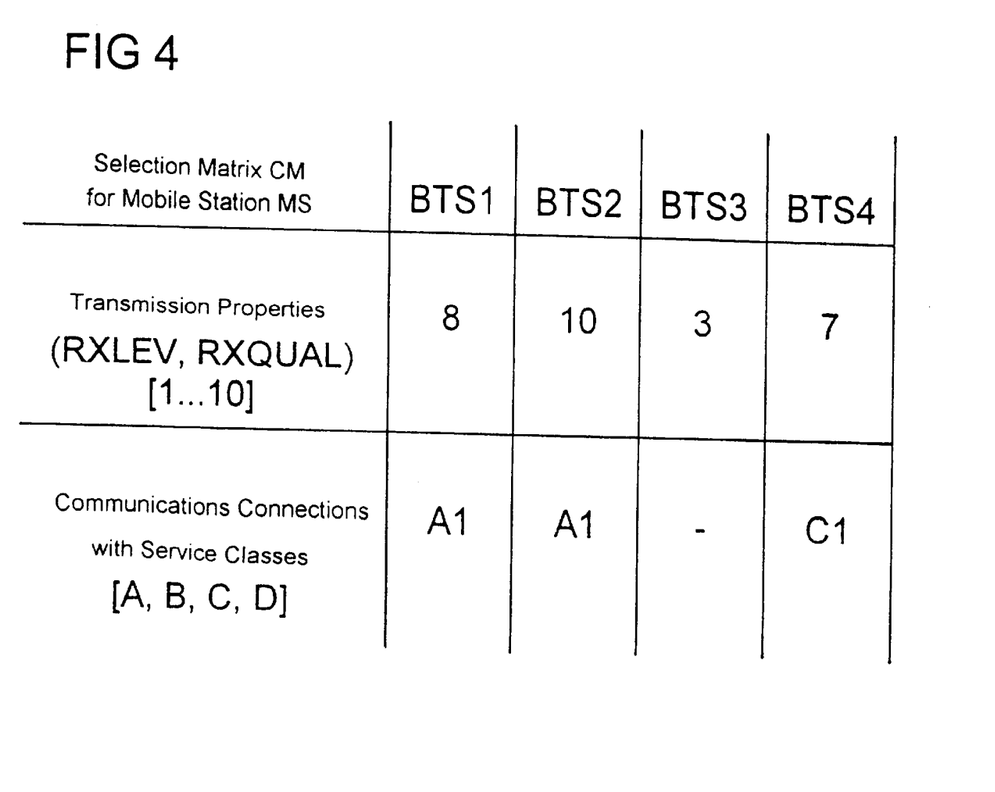
FIG. 4 is a selection matrix for the mobile station.

FIG. 4 illustrates by way of example a selection matrix for a mobile station MS such as can be stored in the memory device SP of the radio network controller RNC. The mobile station MS is located, as illustrated in FIG. 3, in a region where the radio cells of the base stations BTS1 to BTS4 associated with the radio zone overlap. The subscriber wishes to set up two communications links. Communications links can generally be placed in different service classes on the basis of the requirements placed on the transmission. The following exemplary classification is appropriate.

Service class A: Connection at constant bit rate, isochronous voice transmission,
Service class B: Connection with variable bit rate,
Service class C: Connection-oriented packet protocol,
Service class D: Packet data service without connection.

These service classes can, if appropriate, also be divided into real-time and non-real-time communications links. On this basis, the requirements which are placed on the transmission properties for real-time communications links, such as voice or video transmission, are higher than is the case for the transmission of data packets. A further subdivision of service classes on the basis of additional transmission parameters (for example bit error rate, propagation time) is also possible.

The selection matrix CM illustrated for the mobile station MS is divided up as follows. The base stations BTS1 to BTS4 which are administered by the radio network controller RNC are entered in the columns and the parameters are assigned to them in the lines. The selection matrix CM does not have to contain all the parameters specified above, however these parameters are also explained in more detail below.

In the first line, the base stations BTS1 to BTS4 are assigned the transmission properties RXLEV and RXQUAL, evaluated by the signal evaluation device SA in a range from 1 . . . 10, of the radio transmission channels between the base stations BTS1 to BTS4 and the mobile station MS. Better transmission properties are indicated here by higher numerical values.

The selection matrix CM can contain, as further parameter, the properties and performance features of the mobile station MS in the case of the classification of the mobile stations into different mobile station classes. These parameters are written into the selection matrix CM through the use of an exchange of status information, and taken into account during the assignment of the radio transmission channels to the base stations BTS1 to BTS4, or it is determined whether the mobile station MS is at all suitable for communications links with a parallel or sequential transmission of the signal components on a plurality of radio transmission channels from/to a plurality of base stations BTS1 to BTS4.

A mobile station MS which is provided for the application according to the invention should accordingly be equipped in such a way that it can receive and transmit simultaneously or sequentially on a plurality of radio transmission channels.

The period (dwelling time) for which the mobile station MS is located in the radio cells constitutes a parameter which is important in particular with hierarchical cell structures. This parameter makes it possible to configure the assignment of the radio transmission channels to the base stations in such a way that, for example, a rapidly moving mobile station MS is not supplied with micro cells or pico cells by the base stations BTS2 to BTS4 but rather with a macro cell by the base station BTS1, in order to avoid frequent handover between the radio cells.

In the second line of the exemplary selection matrix CM, the communications links with their service classes (A, B, C, D) are assigned to the base stations BTS1 to BTS4 by the control device ST as a function of the parameters.

As an example of the process of the assignment or allocation of the radio transmission channels according to the invention, the simple case is illustrated in which only the parameter of the transmission properties is taken into account in the selection matrix CM. The mobile subscriber wishes simultaneously to make a telephone call (voice transmission—service class A) and to be connected to the Internet (packet data—service class C), designated below as communications links A1 and C1, using his mobile station MS. The transmission properties RXLEV and RXQUAL on the radio interface between the base stations BTS1 to BTS4 and the mobile station MS are measured in the manner described, evaluated by the signal evaluation device SA in the radio network controller RNC and written into the selection matrix CM stored for the mobile station MS. On the first line of the selection matrix CM it is apparent that there are very good or good transmission properties between the mobile station MS and the base stations BTS1 and BTS2. The transmission properties to the base station BTS3 are evaluated as insufficient and those to the BTS4 as adequate. On the basis of this evaluation, the following base stations are determined for the transmission of the two communications links A1 and C1:

| | |
|---|---|
| Telephone call | A1 → BTS1 and BTS2, |
| Connection to Internet | C1 → BTS4. |

The respective base stations are subsequently assigned the radio transmission channels for the transmission of the communications links A1 and C1 by the control device ST in the radio network controller RNC. The selection of the radio transmission channels is made by evaluating the parameters in the resource matrix RM, as is illustrated by way of example in FIG. 5. The base stations BTS1 to BTS4 which are administered by the radio network controller RNC, and to which the radio transmission channels F1 to F5 are assigned in the lines, are entered into the columns of the resource matrix RM. The states of the radio transmission channels are entered at the intersection points of the matrix and are represented by status information such as free, assigned or blocked (due to interference). The control device ST selects one radio transmission channel for each of the base stations BTS1, BTS2 and BTS4 from the number of free radio transmission channels taking into account the interference conditions. The selected radio transmission channels are represented "assigned", in each case through the use of the status information, in FIG. 5. In order to estimate the interference, use is made of the transmission properties between the base stations BTS1 to BTS4 and the mobile station MS, and these properties, which are entered in the selection matrix CM, can be used to draw conclusions about the co-channel interference.

Figure 5:
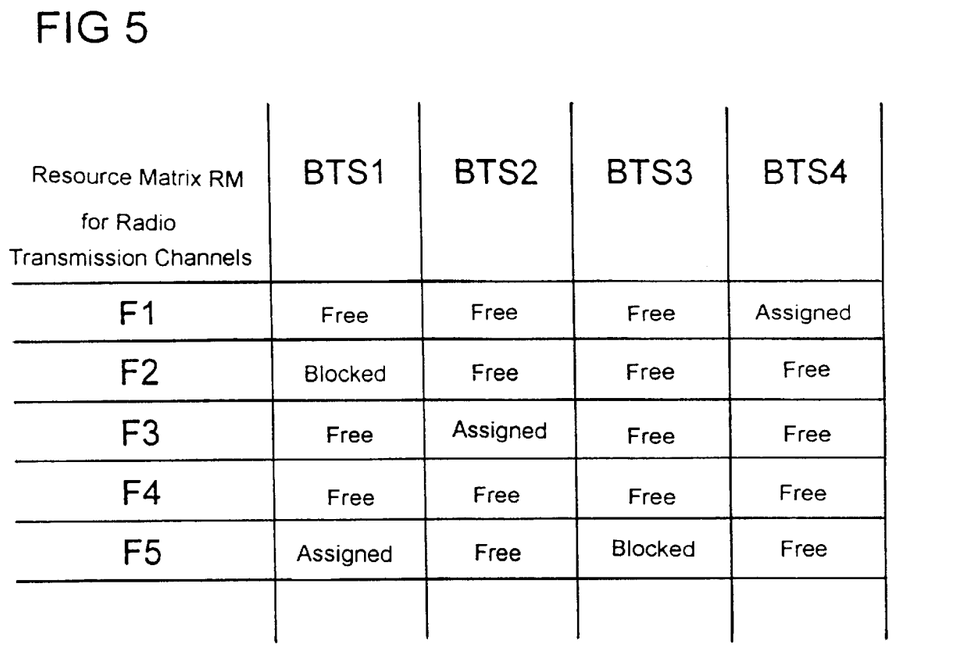
FIG. 5 is a resource matrix for the radio transmission channels.

The selection matrix CM and the resource matrix RM, and thus the selection of the base stations BTS1 to BTS4 for the transmission of the communications links can be continuously changed as the location of the mobile station MS changes and, as a result, the transmission properties between the mobile station MS and the base stations BTS1 to BTS4 changes and communications links are set up and released.

In addition to this exemplary assignment of two communications links A1 and C1 to the base stations BTS1, BTS2 and BTS4, there are further possible ways of assigning the radio transmission channels F1 to F5 in an optimum way for the respective case. Depending on the transmission properties, they can be distributed to one or more base stations. In the event that an asymmetrical communications link occurs, for example of the service class D (packet data service), it is possible that the link is assigned to different radio transmission channels for the downlink direction (BTS→MS) and for the uplink direction (MS→BTS) by a plurality of base stations (BTS1 . . . ). Furthermore, it is also useful to combine a plurality of mobile stations with, for example, communications links of the same service classes in one central selection matrix CM and to assign the radio transmission channels to the base stations BTS1 to BTS4 in a central way.

We claim:

1. In a mobile radio network having base stations supplying radio resources to overlapping radio cells and having a mobile station located in a radio zone of the mobile radio network, a device for administering and assigning radio transmission channels, comprising:
   a signal evaluation device to be connected to the base stations, said signal evaluation device determining transmission properties between the mobile station and the base stations;
   a memory device connected to said signal evaluation device and storing at least one selection matrix and at least one resource matrix, said memory device storing the transmission properties as parameters in said at least one selection matrix, the transmission properties being assigned to respective ones of the base stations, said memory device storing a service class of a communications link as a further parameter, and said memory device administering radio transmission channels to be assigned in the radio zone, the radio transmission channels being parameters in said at least one resource matrix; and
   a control device connected to said memory device, said control device evaluating the parameters in said at least one selection matrix and assigning at least one of the radio transmission channels and at least one of the base stations to the communications link associated with the mobile station such that radio transmission channels associated with a plurality of the base stations are assigned to the communications link associated with the service class.

2. The device according to claim 1, wherein said at least one selection matrix is a plurality of selection matrices, a respective one of said selection matrices being stored for each mobile station in the radio zone.

3. The device according to claim 1, wherein said memory device additionally stores properties and performance features of the mobile station as parameters in said at least one selection matrix, and said control device takes into account the properties and performance features of the mobile station when assigning the at least one of the radio transmission channels and the at least one of the base stations.

4. The device according to claim 1, wherein said memory device additionally stores a time period indicating how long the mobile station is located in the radio cells as a parameter in said at least one selection matrix, and said control device takes into account the time period when assigning the at least one of the radio transmission channels and the at least one of the base stations.

5. The device according to claim 1, wherein said memory device stores the radio transmission channels together with a respective state of the radio transmission channels as parameters in said at least one resource matrix, and said control device takes into account the transmission channels together with the respective state when assigning the at least one of the radio transmission channels.

6. The device according to claim 1, wherein the device for administering and assigning radio transmission channels is implemented in a switching device connected to the mobile radio network.

7. The device according to claim 1, wherein the device for administering and assigning radio transmission channels is implemented as a stand-alone component in the mobile radio network and is connected to a switching device.

8. A network controller configuration, comprising:
   a plurality of devices for assigning radio transmission channels, said plurality of devices including a first device and a second device connected to said first device, each of said first and second devices including:
      a signal evaluation device to be connected to base stations supplying radio resources to overlapping radio cells, said signal evaluation device determining transmission properties between a mobile station located in a radio zone and the base stations;
      a memory device connected to said signal evaluation device and storing at least one selection matrix and at least one resource matrix, said memory device storing the transmission properties as parameters in said least one selection matrix, the transmission properties being assigned to respective ones of the base stations, said memory device storing a service class of a communications link as a further parameter, and said memory device administering radio transmission channels to be assigned in the radio zone, the radio transmission channels being parameters in said at least one resource matrix; and
      a control device connected to said memory device, said control device evaluating the parameters in said at least one selection matrix and assigning at least one of the radio transmission channels and at least one of the base stations to the communications link associated with the mobile station.

9. A method for administering and assigning radio transmission channels to at least one communications link of a mobile radio network, the method which comprises:
   connecting at least one device for administering and assigning radio transmission channels to at least two base stations, the at least two base stations supplying respective overlapping radio cells with radio resources;
   determining and evaluating transmission properties between the at least two base stations and at least one mobile station located in a radio zone of the at least one device for administering and assigning the radio transmission channels;
   storing the transmission properties as parameters in a selection matrix;
   assigning the transmission properties to respective ones of the at least two base station;
   storing a service class of a communications link associated with the at least one mobile station as a further parameter in the selection matrix;
   assigning, with the device for administering and assigning the radio transmission channels, at least one of the radio transmission channels and at least one of the at least two base station to the communications link associated with the at least one mobile station as a function of an evaluation of the parameters and the further parameter in the selection matrix such that radio transmission channels associated with a plurality of the at least two base stations are assigned to the communications link associated with the service class; and
   administering the radio transmission channels assignable in the radio zone in a resource matrix.

10. The method according to claim 9, which comprises determining the transmission properties with at least one of the at least one mobile station and a respective one of the at least two base stations.

11. The method according to claim 9, which comprises cyclically updating the parameters in at least one of the selection matrix and the resource matrix with a signal evaluation device.

12. The method according to claim 9, which comprises selecting, with the device for administering and assigning the radio transmission channels, the at least one of the radio transmission channels and the at least one of the at least two base stations for the communications link associated with the at least one mobile station such that optimum transmission properties are ensured.

13. The method according to claim 9, which comprises initiating a new assignment of the radio transmission channels and a new selection of the at least one of the at least two base stations for the communications link associated with the at least one mobile station as a function of changes in the parameters in the selection matrix.

14. The method according to claim 9, which comprises:
assigning a given number of the at least two base stations to the communications link associated with the at least one mobile station; and
selecting the given number as a function of requirements of the service class in terms of the transmission properties.

15. The method according to claim 9, which comprises:
assigning a given number of the at least two base stations to the communications link associated with the at least one mobile station; and
selecting the given number as a function of a current location of the at least one mobile station.

16. The method according to claim 9, which comprises:
assigning a given number of the at least two base stations to the communications link associated with the at least one mobile station; and
selecting the given number as a function of a radio cell level in a hierarchical radio cell structure.

17. The method according to claim 16, which comprises selecting the given number as a function of a time period, the at least one mobile station being located in a given one of the radio cells during the time period.

18. The method according to claim 9, which comprises assigning radio transmission channels associated with a given one of the at least two base stations to the communications link associated with the service class.

19. The method according to claim 9, which comprises assigning radio transmission channels associated with a plurality of the at least two base stations to the communications link associated with the service class.

20. The method according to claim 9, which comprises assigning radio transmission channels associated with a given one of the at least two base stations to at least two communications links associated with different service classes.

21. The method according to claim 9, which comprises assigning radio transmission channels associated with a plurality of the at least two base stations to at least two communications links associated with different service classes.

22. The method according to claim 20, which comprises assigning respective radio transmission channels of a plurality of the at least two base stations for the different service classes.

23. The method according to claim 21, which comprises assigning respective radio transmission channels of a plurality of the at least two base stations for the different service classes.

24. The method according to claim 9, which comprises assigning radio transmission channels of a plurality of the at least two base stations to an asymmetrical communications link in a downlink direction from the plurality of the at least two base stations to the at least one mobile station and in an uplink direction from the at least one mobile station to the plurality of the at least two base stations.

25. The method according to claim 24, which comprises assigning radio transmission channels of given ones of the at least two base stations to the at least one mobile station in the downlink direction and assigning radio transmission channels of other ones of the at least two base stations to the at least one mobile station in the uplink direction.

26. The method according to claim 9, which comprises:
dividing the communications link into a plurality of signal components; and
assigning the plurality of signal components to different ones of the radio transmission channels associated with different ones of the at least two base stations.

27. The method according to claim 26, which comprises sequentially assigning the signal components of the communications link to different radio transmission channels of a plurality of the at least two base stations.

28. The method according to claim 26, which comprises assigning the signal components of the communications link in parallel to different radio transmission channels of a plurality of the at least two base stations.

29. The method according to claim 9, which comprises administering parameters of a plurality of mobile stations with identical transmission properties in a common selection matrix.

30. The method according to claim 9, which comprises administering parameters of a plurality of mobile stations with communications links of identical service classes in a common selection matrix.

31. In a mobile radio network having base stations supplying radio resources to overlapping radio cells and having a mobile station located in a radio zone of the mobile radio network, a device for administering and assigning radio transmission channels, comprising:
a signal evaluation device to be connected to the base stations, said signal evaluation device determining transmission properties between the mobile station and the base stations;
a memory device connected to said signal evaluation device and storing at least one selection matrix and at least one resource matrix, said memory device storing the transmission properties as parameters in said at least one selection matrix, the transmission properties being assigned to respective ones of the base stations, said memory device storing service classes of communications links as further parameters, and said memory device administering radio transmission channels to be assigned in the radio zone, the radio transmission channels being parameters in said at least one resource matrix; and
a control device connected to said memory device, said control device evaluating the parameters in said at least one selection matrix and assigning at least one of the radio transmission channels and at least one of the base stations to the communications link associated with the mobile station such that radio transmission channels associated with a given one of the base stations are assigned to at least two of the communications links associated with different ones of the service classes.

32. In a mobile radio network having base stations supplying radio resources to overlapping radio cells and having a mobile station located in a radio zone of the mobile radio network, a device for administering and assigning radio transmission channels, comprising:

a signal evaluation device to be connected to the base stations, said signal evaluation device determining transmission properties between the mobile station and the base stations;

a memory device connected to said signal evaluation device and storing at least one selection matrix and at least one resource matrix, said memory device storing the transmission properties as parameters in said at least one selection matrix, the transmission properties being assigned to respective ones of the base stations, said memory device storing service classes of communications links as further parameters, and said memory device administering radio transmission channels to be assigned in the radio zone, the radio transmission channels being parameters in said at least one resource matrix; and a control device connected to said memory device, said control device evaluating the parameters in said at least one selection matrix and assigning at least one of the radio transmission channels and at least one of the base stations to the communications link associated with the mobile station such that radio transmission channels associated with a plurality of the base stations are assigned to at least two of the communications links associated with different ones of the service classes.

33. In a mobile radio network having base stations supplying radio resources to overlapping radio cells and having a mobile station located in a radio zone of the mobile radio network, a device for administering and assigning radio transmission channels, comprising:

a signal evaluation device to be connected to the base stations, said signal evaluation device determining transmission properties between the mobile station and the base stations;

a memory device connected to said signal evaluation device and storing at least one selection matrix and at least one resource matrix, said memory device storing the transmission properties as parameters in said at least one selection matrix, the transmission properties being assigned to respective ones of the base stations, said memory device storing a service class of a communications link as a further parameter, and said memory device administering radio transmission channels to be assigned in the radio zone, the radio transmission channels being parameters in said at least one resource matrix; and a control device connected to said memory device, said control device evaluating the parameters in said at least one selection matrix and assigning at least one of the radio transmission channels and at least one of the base stations to the communications link associated with the mobile station such that radio transmission channels associated with a plurality of the base stations are assigned to an asymmetrical communications link in a downlink direction from the plurality of the base stations to the mobile station and in an uplink direction from the mobile station to the plurality of the base stations.

34. In a mobile radio network having base stations supplying radio resources to overlapping radio cells and having a mobile station located in a radio zone of the mobile radio network, a device for administering and assigning radio transmission channels, comprising:

a signal evaluation device to be connected to the base stations, said signal evaluation device determining transmission properties between the mobile station and the base stations;

a memory device connected to said signal evaluation device and storing at least one selection matrix and at least one resource matrix, said memory device storing the transmission properties as parameters in said at least one selection matrix, the transmission properties being assigned to respective ones of the base stations, said memory device storing a service class of a communications link as a further parameter, and said memory device administering radio transmission channels to be assigned in the radio zone, the radio transmission channels being parameters in said at least one resource matrix; and a control device connected to said memory device, said control device evaluating the parameters in said at least one selection matrix and assigning at least one of the radio transmission channels and at least one of the base stations to the communications link associated with the mobile station, said control device dividing the communications link into a plurality of signal components and assigning the plurality of signal components to different ones of the radio transmission channels associated with different ones of the base stations.

35. A method for administering and assigning radio transmission channels to at least one communications link of a mobile radio network, the method which comprises:

connecting at least one device for administering and assigning radio transmission channels to at least two base stations, the at least two base stations supplying respective overlapping radio cells with radio resources;

determining and evaluating transmission properties between the at least two base stations and at least one mobile station located in a radio zone of the at least one device for administering and assigning the radio transmission channels;

storing the transmission properties as parameters in a selection matrix;

assigning the transmission properties to respective ones of the at least two base station;

storing service classes of communications links associated with the at least one mobile station as further parameters in the selection matrix;

assigning, with the device for administering and assigning the radio transmission channels, at least one of the radio transmission channels and at least one of the at least two base station to a communications link associated with the at least one mobile station as a function of an evaluation of the parameters and the further parameter in the selection matrix such that radio transmission channels associated with a given one of the at least two base stations are assigned to at least two communications links associated with different service classes; and administering the radio transmission channels assignable in the radio zone in a resource matrix.

36. A method for administering and assigning radio transmission channels to at least one communications link of a mobile radio network, the method which comprises:

connecting at least one device for administering and assigning radio transmission channels to at least two base stations, the at least two base stations supplying respective overlapping radio cells with radio resources;

determining and evaluating transmission properties between the at least two base stations and at least one mobile station located in a radio zone of the at least one device for administering and assigning the radio transmission channels;

storing the transmission properties as parameters in a selection matrix;

assigning the transmission properties to respective ones of the at least two base station;

storing service classes of communications links associated with the at least one mobile station as further parameters in the selection matrix;

assigning, with the device for administering and assigning the radio transmission channels, at least one of the radio transmission channels and at least one of the at least two base station to a communications link associated with the at least one mobile station as a function of an evaluation of the parameters and the further parameter in the selection matrix such that radio transmission channels associated with a plurality of the at least two base stations are assigned to at least two communications links associated with different service classes; and administering the radio transmission channels assignable in the radio zone in a resource matrix.

37. A method for administering and assigning radio transmission channels to at least one communications link of a mobile radio network, the method which comprises:

connecting at least one device for administering and assigning radio transmission channels to at least two base stations, the at least two base stations supplying respective overlapping radio cells with radio resources;

determining and evaluating transmission properties between the at least two base stations and at least one mobile station located in a radio zone of the at least one device for administering and assigning the radio transmission channels;

storing the transmission properties as parameters in a selection matrix;

assigning the transmission properties to respective ones of the at least two base station;

storing a service class of a communications link associated with the at least one mobile station as a further parameter in the selection matrix;

assigning, with the device for administering and assigning the radio transmission channels, at least one of the radio transmission channels and at least one of the at least two base station to the communications link associated with the at least one mobile station as a function of an evaluation of the parameters and the further parameter in the selection matrix such that radio transmission channels of a plurality of the at least two base stations are assigned to an asymmetrical communications link in a downlink direction from the plurality of the at least two base stations to the at least one mobile station and in an uplink direction from the at least one mobile station to the plurality of the at least two base stations; and administering the radio transmission channels assignable in the radio zone in a resource matrix.

38. A method for administering and assigning radio transmission channels to at least one communications link of a mobile radio network, the method which comprises:

connecting at least one device for administering and assigning radio transmission channels to at least two base stations, the at least two base stations supplying respective overlapping radio cells with radio resources;

determining and evaluating transmission properties between the at least two base stations and at least one mobile station located in a radio zone of the at least one device for administering and assigning the radio transmission channels;

storing the transmission properties as parameters in a selection matrix;

assigning the transmission properties to respective ones of the at least two base station;

storing a service class of a communications link associated with the at least one mobile station as a further parameter in the selection matrix;

assigning, with the device for administering and assigning the radio transmission channels, at least one of the radio transmission channels and at least one of the at least two base station to the communications link associated with the at least one mobile station as a function of an evaluation of the parameters and the further parameter in the selection matrix;

dividing the communications link into a plurality of signal components;

assigning the plurality of signal components to different ones of the radio transmission channels associated with different ones of the at least two base stations; and administering the radio transmission channels assignable in the radio zone in a resource matrix.

* * * * *